United States Patent Office 3,328,428
Patented June 27, 1967

3,328,428
PURIFICATION OF PYROMELLITIC
DIANHYDRIDE
Joseph F. McMahon, Clinton, N.J., assignor to Princeton Chemical Research, Inc., Princeton, N.J., a corporation of New Jersey
No Drawing. Filed Nov. 29, 1965, Ser. No. 510,386
7 Claims. (Cl. 260—346.3)

This is a continuation-in-part of application Ser. No. 421,080, filed Dec. 24, 1964 now abandoned.

This invention relates to improvements in the purification of pyromellitic dianhydride and pyromellitic acid. The invention more particularly relates to a process for producing high purity pyromellitic dianhydride and/or pyromellitic acid from the crude solids produced in the production thereof, such as by the oxidation of durene.

Various processes are known or have been proposed for the production of pyromellitic dianhydride and pyromellitic acid. These processes generally result in the formation of a crude solid which must be subjected to further extensive purification in order to produce pyromellitic dianhydride or acid of high purity which is suitable for commercial applications as for example, in the production of plastics.

The known and proposed purification treatments are difficult, time consuming, and expensive, involving dissolution and recrystallization from solvents, or dissolution of the crude product in an aqueous medium followed by purification of the solution, recrystallization of the acid and dehydration and further purification to form the pure anhydride. Other proposed processes for the purification of the pyromellitic dianhydride involve treatments with hydrocarbon solvents and sublimation or specialized treatment of an acid solution, separation of the solid acid and dehydration under carefully controlled conditions of relatively high temperature.

One object of this invention is an improved, simplified process of purifying crude pyromellitic dianhydride and/or pyromellitic acid. This and still further objects will become apparent from the following description:

In accordance with the invention, it has been surprisingly discovered that crude pyromellitic dianhydride or acid may be converted to a high purity material by simple treatment with a substantially non-reactive gas stream at a given elevated temperature range.

The terms "crude pyromellitic dianhydride" or "crude pyromellitic acid" as used herein and in the claims are understood to designate the impure product as is obtained in its process of production. While the purification process in accordance with the invention is particularly well suited for treatment of the crude product as is obtained by the oxidation of durene, the same is also applicable for the purification of the crude product obtained by any of the other known processes. The process in accordance with the invention has been found to be particularly effective and convenient for purifying the crude solids produced by the catalytic air oxidation of durene, as for example described in application Ser. No. 385,801, filed July 28, 1964, now abandoned.

In accordance with the invention the non-reactive gas stream used for the purification is contacted with the crude pyromellitic dianhydride or acid at a temperature between 75 and 275° C., and preferably at temperatures between 100 and 200° C. for a period of time sufficient to remove the impurities.

Any gas which will not react with the pyromellitic dianhydride or acid at the temperature in question may be used for the purification, and such gas is referred to herein and in the claims as non-reactive, the non-reactivity referring to the non-reactivity with the product treated under the conditions specified. Where the desired product includes pyromellitic acid, a water containing gas or water itself (steam) is considered within the terms of the invention and claims as a non-reactive gas even though the same may convert some of the dianhydride to the acid.

Air is generally preferred as the treating gas because of its ready availability, low cost, and because the same can be dried very economically and conveniently, as for example, by passing the same through a bed of desiccant, such as activated alumina, silica gel, or molecular sieves. Other gases, as for example, nitrogen, or carbon dioxide, may also be conveniently used.

Where pyromellitic dianhydride is the desired product, the gas should not contain water or water vapor in an amount capable of converting the dianhydride to the acid. The amount of water vapor in the gas which will do this depends on the particular treating conditions and temperature, and the maximum permissible amount of water vapor may be readily empirically determined for each situation. Generally at higher temperatures greater amounts of water vapor will be tolerated without conversion of the dianhydride to the acid.

In various processes for producing the pyromellitic dianhydride or the pyromellitic acid, the crude reaction product is obtained in a tail gas stream which already contains "a non-reactive" gas, such as air. In such processes, it is possible to use this non-reactive gas already present in the tail gas stream as a portion or as all of the treating gas. For this purpose, the tail gas stream is cooled, either indirectly by the injection or additional cooler non-reactive gas, such as air, and/or by the injection of steam or water vapor, to a temperature within the treating temperature range, and the crude product is maintained in contact with the gas at this temperature for a period of time sufficient to remove the impurities, and then the product is separated from the gas. Preferably, this is done by passing the stream through a porous surface which will retain the solids. As the gas moves through this porous surface, an effective contacting with the retained solids is achieved which further aids in the purification. The solids are then recovered from the porous surface. Thus, for example, the tail gas, after being cooled, for example after the introduction of further air and/or water, to a temperature between 75 and 275° C., and preferably between 100 and 200° C., and maintained in contact with the crude solids for a period of time sufficient for the purification, which again may be empirically determined, is passed through a bag collector where the purified product is collected.

This mode of purification has proven particularly effective and economical for the treatment of the crude products obtained by the process described in co-pending application Ser. No. 385,801, filed July 21, 1964.

The ratio of the treating gas to the crude solids may vary within wide limits depending on the temperature and the amount of impurities to be removed. It has, however, been found preferable to use a ratio of treating gas to crude solids in the range of about 1 to 200 pounds per pound.

Where a separate stream of treating gas is passed in contact with the crude product, its flow rate may vary within wide limits, as for example, between 0.01 pound of treating gas per hour per pound of crude solids to 200 pounds of treating gas per hour per pound of crude solids. It has been found preferable however, that the flow rate of the treating gas be maintained in the range of 1 to 150 pounds of treating gas per hour per pound of crude solids.

The pressure of the treating gas is not at all critical and may range from the lowest subatmospheric pressure above the vapor pressure of the pyromellitic dianhydride to the highest pressure practical, as for example from subatmospheric pressure to pressures of 1,000 pounds per square inch and more. Generally, for convenience, and reasons of economy the treatment is effected at ambient pressure.

The treating time which may be as low as a fraction of a second, depends on the degree of purity desired and the other conditions, and may very readily be empirically determined. In general treating times of more than 30 hours will not be required to produce a pure, commercially acceptable product.

The actual contacting may be effected in any known or desired manner for contacting a solid with a gas stream, as for example by passing the treating gas through a fixed bed of the crude solids; by flowing the gas stream over a layer of the solids; by suspending or fluidizing the solids in the gas stream; by maintaining the solids on a filter or other gas-permeable surface and passing the gas stream therethrough, or the like.

In accordance with a preferred embodiment of the invention, the crude pyromellitic dianhydride is produced by the catalytic air oxidation of durene, as described in application Ser. No. 385,801 by contacting a gas stream containing the air and durene with a niobium vanadate catalyst at a temperature between about 400–600° C. The temperature of the tail gas stream from this process is then reduced to between 75 to 275° C., preferably by the introduction of cooler air (and/or injected water if the presence of the acid is not undesirable), and then the solid particles of the purified product are collected on a gas permeable surface, such as a bag collector, the contact time of the particles in the stream and in the bag collector being sufficient for the purification.

The following examples are given by way of illustration and not limitation:

EXAMPLE 1

4.62 grams of crude solid pyromellitic dianhydride as obtained by the vapor phase catalytic oxidation of durene were placed in a nickel boat which was positioned in a 1″ diameter quartz tube. Air, which had been dried by passing through a bed of granular anhydrous calcium sulfate and which had a moisture content of less than 0.2 mole percent was passed through the tube at normal pressure at the rate of 260 cc. per minute at a temperature of 155° C. After a treatment time of 22 hours, 4.10 grams of purified solids remained in the boat. Analysis of the solids before and after treatment is shown in Table I below:

TABLE I

|  | Solids | |
|---|---|---|
|  | Before Treatment | After Treatment |
| Melting point, ° C | 260–266 | 276–280 |
| Percent pyromellitic dianhydride in solids | 89 | 99+ |

EXAMPLE 2

Example 1 may be repeated using the following dry gases in place of air: nitrogen, carbon dioxide, helium, methane, butane and pentane.

Pyromellitic dianhydride of the same purity as in Example 1 is obtained.

EXAMPLE 3

Crude pyromellitic dianhydride solids obtained by the vapor phase oxidation of durene were purified by the procedure of this invention. A weighed amount of crude solids, 5.0 grams, was placed in a 1″ diameter glass tube. Nitrogen gas, containing less than 0.2 mole percent water, was passed at a rate of 2 liters per minute upflow through the solids at a temperature of 160° C. After 4 hours treatment, purified solids were recovered from the tube and analyzed. Analysis of the solids before and after treatment is shown below:

TABLE II

|  | Solids | |
|---|---|---|
|  | Before Treatment | After Treatment |
| Melting point, ° C | 251–254 | 277–280 |
| Percent pyromellitic dianhydride in solids | 89.3 | >99 |

EXAMPLE 4

Crude pyromellitic dianhydride solids obtained by the vapor phase oxidation of durene were purified by the procedure of this invention. A weighed amount of crude solids, 5.0 grams, was placed in a 1″ diameter glass tube. Nitrogen gas, containing less than 0.2 mole percent water, was passed at a rate of 2 liters per minute upflow through the solids at a temperature of 140° C. After 4 hours treatment, purified solids were recovered from the tube and analyzed. Analysis of the solids before and after treatment is shown below:

TABLE III

|  | Solids | |
|---|---|---|
|  | Before Treatment | After Treatment |
| Melting point, ° C | 251–254 | 271–274 |
| Percent pyromellitic dianhydride in solids | 89 | 99 |

EXAMPLE 5

Example 3 is repeated, except that the nitrogen gas contains 40 mol percent water. Equivalent results are obtained.

EXAMPLE 6

Example 1 is repeated, using pure steam in place of the air. The crude product is purified to a high state of purity and contains pyromellitic acid.

EXAMPLE 7

The tail gases from a vapor phase catalytic reactor contain 4200 lbs./hr. air and 60 lbs./hr. of crude pyromellitic dianhydride (90% pure). The gases exit from the reactor at 387.8° C. and are cooled to 148.9° C. by injection of about 0.55 gallon per minute of water and about 1400 lbs./hr. of air at 37.8° C. The cooled gases pass into a commercial bag collector where they have a residence time of about 2 seconds. A 99.5% pure mixture of (85%) pyromellitic dianhydride and (14.5%) pyromellitic acid is continuously discharged from the bottom of the bag collector.

While the invention has been described in detail with reference to certain specific embodiments, various changes and modifications which fall within the spirit of the invention and scope of the appended claims will become apparent to the skilled artisan. The invention is, therefore, only intended to be limited by the appended claims or their equivalents wherein I have endeavored to claim all inherent novelty.

I claim:

1. In the process for producing pyromellitic dianhydride, wherein durene is oxidized at elevated temperature to produce pyromellitic dianhydride and pyromellitic acid and wherein the oxidation product is solidified; the improvement which comprises purifying said solid product by contacting such with a non-reactive gas at a temperature of about 75 to 275° C. for a time sufficient to increase the purity of said pyromellitic dianhydride.

2. Process as claimed in claim 1, wherein said oxidation is catalytic air oxidation in the vapor phase.

3. Process according to claim 1 in which said contacting is effected at a temperature between 100 and 200° C.

4. Process according to claim 1 in which said contacting is effected utilizing about 0.01 to 150 pounds of gas per hour per pound of solid crude product being treated.

5. Process according to claim 1 in which said gas is air.

6. Process according to claim 2 in which the air containing tail gas stream from the catalytic oxidation of durene is cooled to a temperature between 75 and 275° C. and contacted with said solid product.

7. Process according to claim 6 in which the purified product is recovered from treatment with the cooled tail gas in a bag collector.

References Cited

Weissberger, Editor, Techniques of Organic Chemistry, vol. 4 (1951), page 17.

NICHOLAS S. RIZZO, *Primary Examiner*.